United States Patent [19]

Blomquist

[11] Patent Number: 4,878,823
[45] Date of Patent: Nov. 7, 1989

[54] APPARATUS FOR APPLYING A LABEL TO AN OPEN MOLD HALF

[75] Inventor: Leonard A. Blomquist, Joliet, Ill.

[73] Assignee: Continental Plastic Containers, Inc., Norwalk, Conn.

[21] Appl. No.: 585,077

[22] Filed: Mar. 1, 1984

[51] Int. Cl.[4] .................... B29B 11/06; B65C 9/14
[52] U.S. Cl. ................... 425/116; 425/523; 425/540; 425/126.1
[58] Field of Search ........... 425/110, 116, 123, 126 R, 425/522, 523, 540; 264/509; 221/211; 271/102 X, 107 X

[56] References Cited

U.S. PATENT DOCUMENTS

| | | | |
|---|---|---|---|
| 4,355,967 | 10/1982 | Hellmer | 264/509 |
| 4,418,906 | 12/1983 | Scott | 271/99 |
| 4,479,644 | 10/1984 | Bartimes et al. | 264/509 |

Primary Examiner—Merrell C. Cashion, Jr.
Attorney, Agent, or Firm—Charles E. Brown; Paul Shapiro; Charles A. Brown

[57] ABSTRACT

This relates to an apparatus for applying labels to inner and outer mold halves of a Ferris wheel type blow molding machine. Most particularly, it relates to the substitution of extensible fluid motors for rotary motors wherein a saving of transverse dimensional spacing results, thereby permitting the two label transfer apparatuses to be in closer circumferentially adjacent relation and thereby permitting the proper timing of the applications of labels to relatively short blow molds. This abstract forms no part of the specification of this application and is not to be construed as limiting the claims of the application.

10 Claims, 2 Drawing Sheets

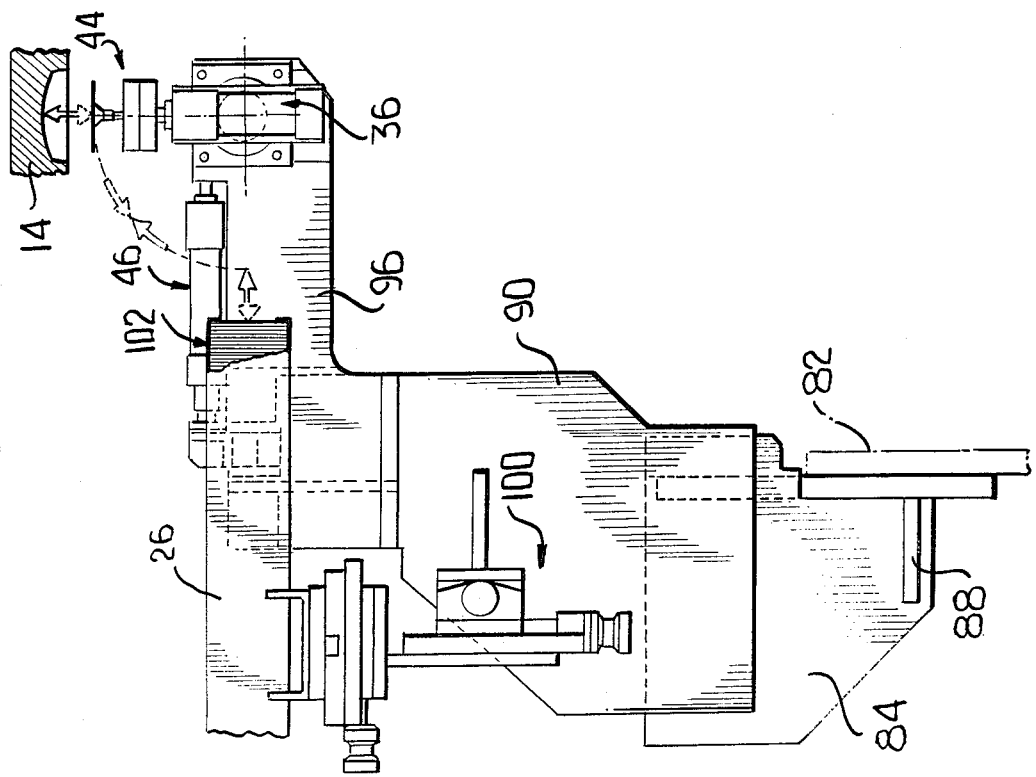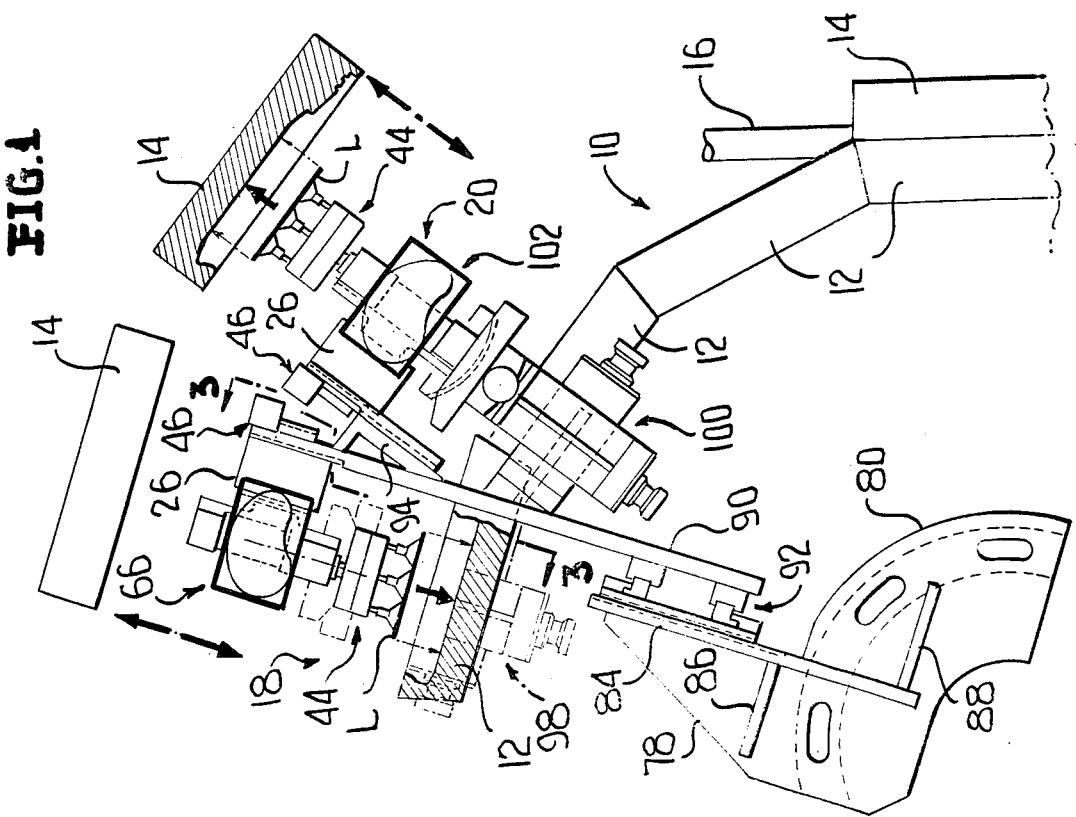

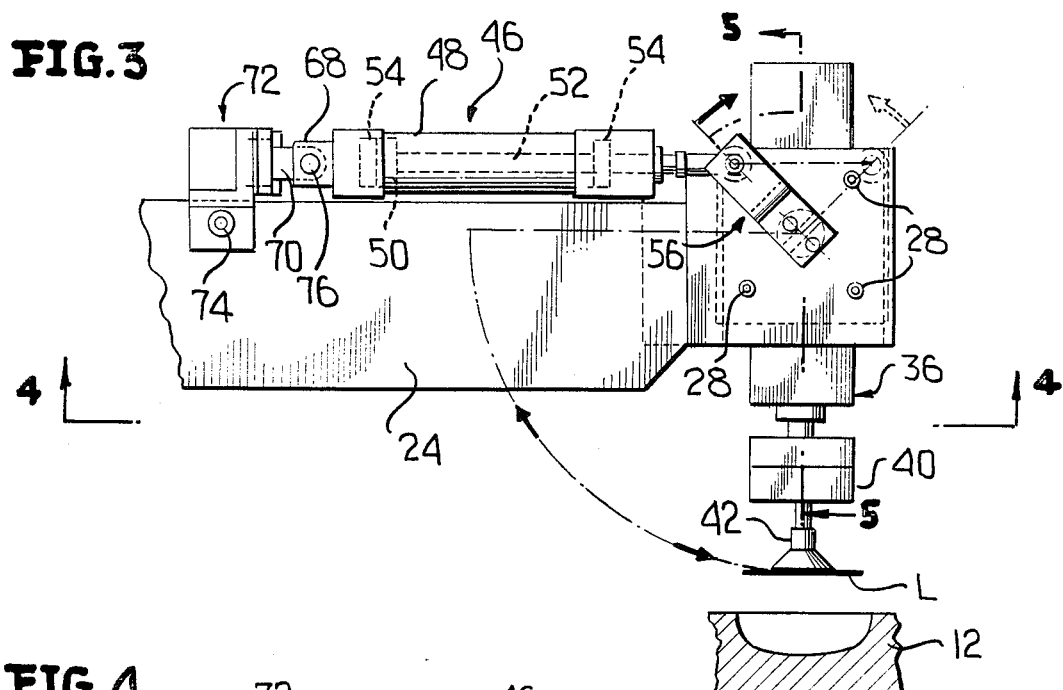
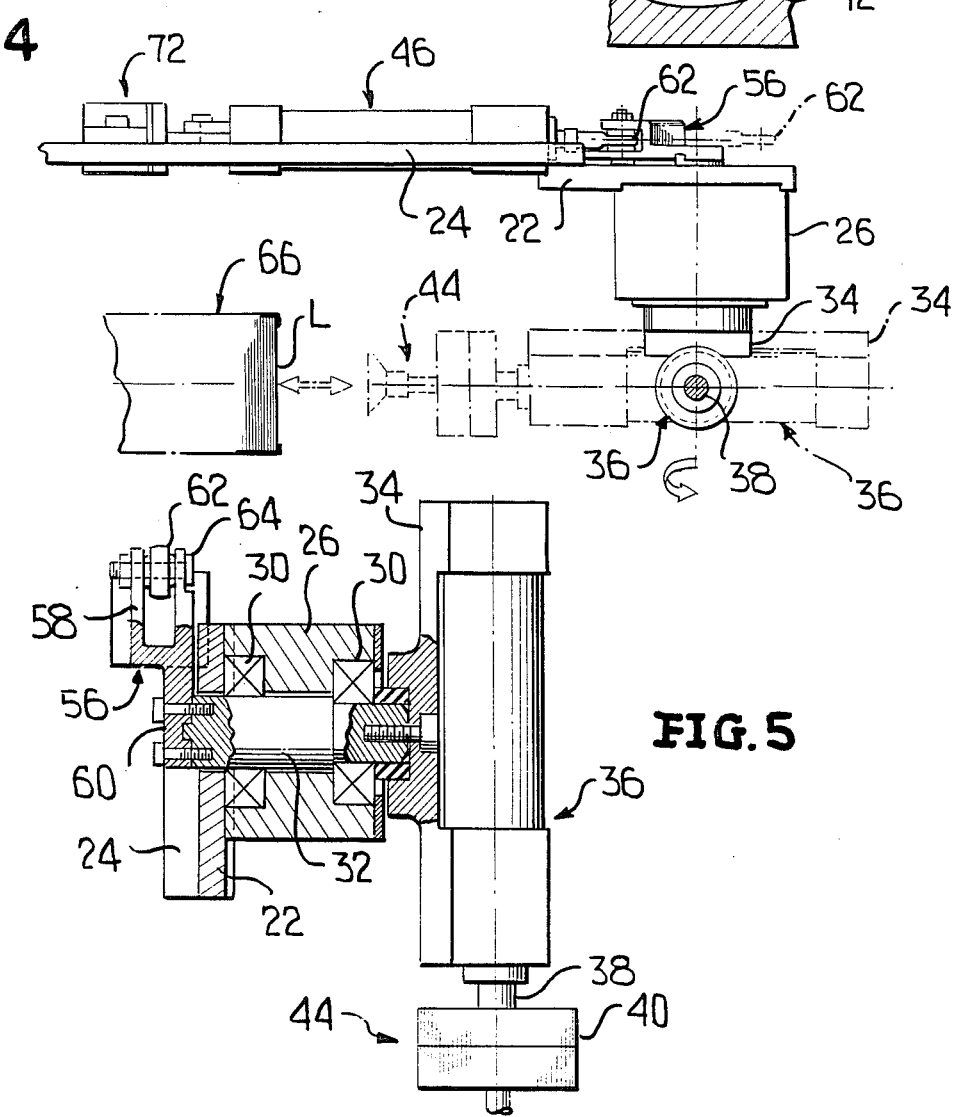

APPARATUS FOR APPLYING A LABEL TO AN OPEN MOLD HALF

This invention relates in general to new and useful improvements in label applicators, and more particularly to an apparatus for applying a label to an open blow mold half.

Most particularly, this invention relates to the application of labels to open mold halves of blow molding apparatus of the Ferris wheel type wherein an extruded tubular parison is clamped between two circumferentially split mold halves at generally a 3:00 o'clock position after which the mold halves rotate in unison to a position approaching a 12:00 o'clock position, at which time the outer mold half moves radially away from a fixed inner mold half and the blow molded article, such as a bottle, is ejected from the mold halves. The mold halves can remain in their open state for only a limited portion of their circumferential path of movement. During this time, labels which are to be applied to the open mold halves must be applied.

All of the label applying apparatus including magazines for the labels must be mounted on one side of the blow molding apparatus and, because of the very short arcuate extent of movement of the mold halves available for the placement of the labels, all of the apparatus including magazines and transfer mechanism must be crowded in a very small space.

There has been recently developed label transfer mechanism which includes a shaft which carries a support unit at one end and which support unit, in turn, carries an extensible fluid motor which carries and selectively projects a label pick-up and delivery suction head. The other end of the shaft has coupled thereto an oscillating rotary motor. Despite the fact that the rotary motor has an axial dimension only on the order of two inches plus one inch for fluid fittings, it has been found that there is insufficient space for that rotary motor when labels are to be applied to both the inner mold half and the outer mold half. Accordingly, there has been sought a suitable drive means which will oscillate the shaft through an arc on the order of 90° at the required speed.

In accordance with this invention, it has been found that an air cylinder having a ⅜ inch bore will provide sufficient force at 100 p.s.i. to effect the desired oscillation of the shaft and the label pick-up mechanism carried thereby. This small bore air cylinder having a three inch stroke, when coupled to the shaft by a lever arm providing the necessary force multiplication factor, has provided the adequate drive while occupying much less than the identified three inches previously required space so as to permit the mounting of two such air motors in side-by-side relation.

With the above and other objects in view that will hereinafter appear, the nature of the invention will be more clearly understood by reference to the following detailed description, the appended claims, and the several views illustrated in the accompanying drawings.

IN THE DRAWINGS

FIG. 1 is a schematic elevational view with parts out of phase showing the manner in which two label magazines and two label transfer units may be mounted for applying labels to radially inner and outer halves of a radially split blow mold.

FIG. 2 is an elevational view of the label transfer apparatus as viewed from the right in FIG. 1, with parts broken away and the outer mold half shown in transverse section.

FIG. 3 is a side elevational view, taken generally along the line 3—3 of FIG. 1, of the mounting of the label transfer apparatus for feeding labels to the radially inner mold half.

FIG. 4 is a sectional view, taken generally along the line 4—4 of FIG. 3, showing the specific details of the label transfer apparatus for the inner mold half.

FIG. 5 is an enlarged fragmentary sectional view taken substantially along the line 5—5 of FIG. 3, and shows further the details of the label transfer apparatus.

Referring now to the drawings in detail, it will be seen that there is illustrated in FIG. 1 certain of the molds of a Ferris wheel blow molding machine with the molds being restricted to those inner blow mold halves which appear between the 12:00 o'clock and the 3:00 o'clock positions and certain of the outer blow mold halves which are associated therewith. The blow molding machine, which is conventional, is generally identified by the numeral 10 and includes a fixed set of radially inner blow mold halves 12 which are mounted for rotation in unison about a horizontal axis. The radially outer blow mold halves are identified by the numeral 14 and while they are mounted for rotation in unison with respective inner blow mold halves 12, they are mounted in a conventional manner for radially outward movement initially to permit the removal of a previously blow molded article therefrom.

It is to be understood that the mold halves 12, 14 reach their fully opened positions at generally the 12:00 o'clock position and the previously blow molded article is immediately ejected therefrom. The circumferential extent of movement of the outer blow mold halves 14 before they must return to their radially inner positions in association with the inner blow mold halves 12 is very restricted, as is shown in FIG. 1.

In operation, there is provided a continuous tubular parison 16 which is ejected from a suitable extruder head (not shown) and the outer blow mold half 14 must move from its widely radially spaced position generally at the 1:00 o'clock position to a position clampingly engaging its associated inner mold half 12 at the 3:00 o'clock position wherein a section of the tubular parison 16 is clamped between the two cooperating blow mold halves 12, 14.

In FIG. 1 there has been shown a first apparatus generally identified by the numeral 18, for delivering a label into the interior of each blow mold half 12. There has also been illustrated a second label delivery apparatus 20 for delivering a label into each of the radially outer blow mold halves 14. For purposes of illustration only, there has been shown the simultaneous application of a label L to a first outer blow mold half 14 and to an inner blow mold half 12 of a next following set of molds. In actuality the timing will be such that a label will be first placed in an inner blow mold half and then shortly thereafter into an associated outer blow mold half.

The two label applying apparatuses 18, 20 are basically of identical construction and vary only in the direction of rotation of a label from its associated magazine to an associated mold half. Accordingly, the basics of each label transfer apparatus will first be described without specific reference to FIG. 1.

Referring now to FIG. 5, it will be seen that there is illustrated a mounting plate 22 which is secured to an end portion of a support member 24. The details of the support member 24 will be described hereinafter. The mounting plate 22 is specifically constructed to receive an end of a housing 26 which is secured in place by screws 28 (FIG. 3). The housing 26 is provided with bearings 30 in which there is journalled a short shaft 32. The shaft 32 is, however, of a length to pass out of opposite ends of the housing 26 and also of a length to pass through the mounting plate 22.

The shaft 32 at the end of the housing 26 remote from the mounting plate 22 carries a support fixture 34 for an extensible fluid motor 36. The extensible fluid motor is in fact a double acting air cylinder and has a projecting piston rod 38 which carries a mounting unit 40 for a plurality of suction cups 42. The mounting unit 40 and the suction cups or heads 42 form a label pick-up and delivery head 44.

It is necessary that the shaft 32 be repeatedly oscillated through an arc on the order of 90° so that, as is best shown in FIG. 2, the suction head 44 may be first presented to a label magazine to pick up a label L and then rotated to a position aligned with a blow mold half for presenting the label into the interior of the mold half. This movement is best shown in FIG. 2.

A principal feature of this invention is to provide drive means for the shaft 32 which will effect the required oscillation thereof and yet will require a minimum of space in a circumferential direction with reference to FIG. 1.

In accordance with this invention and with particular reference to FIGS. 3 and 5, it has been found that the drive means which will perform satisfactorily and yet occupy a minimum of circumferential space will be a small elongated extensible fluid motor generally identified by the numeral 46. Most particularly, it has been found that an air cylinder identified as TOM THUMB MP1 will perform satisfactorily. This air cylinder has a ¾ inch bore and a 3 inch stroke and is provided at each end thereof with an internal shock absorber to facilitate rapid but controlled deceleration at each end of the piston stroke. The air cylinder or fluid motor 46, at 100 p.s.i. air pressure, will provide 44 pounds push and 33 pounds pull as compared to the previous rotary air motors 23 inch/pound force.

With particular reference to FIG. 3, it will be seen that the fluid motor 46 includes a cylinder 48 having mounted therein for reciprocation a piston 50 which carries a piston rod 52 which projects beyond the cylinder 48 at one end thereof. Also, as previously described, the cylinder 48 has at opposite ends thereof shock absorbers 54.

In accordance with this invention, there is keyed and bolted onto that end of the shaft 32 which extends through the mounting plate 22 a fitting 56. It will be seen that the fitting 56 is in the form of a lever arm having a bifurcated end 58 and a mounting leg 60 which is secured to the shaft 32.

The piston rod 52 is provided with an eye type fitting 62 which is received in the bifurcated end 58 and is coupled thereto by a bolt or like member 64. Further, as is shown in FIG. 3, the lever arm 56 will be beneficially mounted relative to the support unit 34 so that when the extensible fluid motor 36 is vertical the lever arm 56 will be offset from the vertical in a counterclockwise direction 90°. With this positioning of the lever arm it will be seen that when the extensible fluid motor 36 opposes an associated label magazine 66 (FIG. 4), the lever arm 56 will be in a position 45° in advance of the vertical in a clockwise direction. Thus, a maximum effective lever arm length is provided.

With particular reference to FIGS. 3 and 4, it will be seen that the mounting plate 32 overlaps and is secured by way of welding to an end portion of the generally horizontal support member 24. Further, it will be seen that the mounting plate 22 is slightly notched to provide clearance for one end of the fluid motor 46. Thus, the fluid motor 46 generally overlies the support member 24. The end of the cylinder 48 remote from the projecting piston rod 52 is provided with a bifurcated mounting fitting 68 which receives therebetween a mounting flange 70 carried by a fitting 72 which is suitably seated on and bolted to the support member 24 by means of a bolt 74. A pin or bolt 76 secures the flange 70 to the bifurcated fitting 68.

Reference is now once again made to FIG. 1 as well as FIG. 2, wherein it will be seen that there is provided a mounting plate 78 which has an arcuate lower portion 80 of a size and shape to be adjustably bolted onto a frame member 82 of the blow molding machine 10. The plate 78 carries on the outer face thereof, i.e. facing away from the blow molding machine 10, a support plate 84 which is braced by a pair of braces 86, 88.

The support plate 84 extends radially. There is a further support plate 90 which extends radially and is separated from the support plate 84 by an adjustable mounting unit 92 which permits axial and radial adjustment of the support plate 90 relative to the support plate 84.

In the illustrated embodiment of the invention the above desribed support member 24 may be an integral part of the support plate 90.

It will thus be seen that the label transfer apparatus 18 may be directly mounted relative to the support plate 90 on the left side thereof as viewed in FIG. 1. On the other hand, to provide clearance the label transfer apparatus 20 is not only mounted to the right of the support plate 90, but is spaced therefrom utilizing an angular spacer 94 which is secured to the right face of the support plate 90 and, in turn, carries a separate support member 96 (FIG. 2) on which a mounting plate similar to the mounting plate 22 may be secured or which may be so machined directly to receive the housing 26 of the label transfer apparatus 20 as shown in FIG. 2.

It is also to be understood that the support plate 90 will carry mounting mechanisms 98 and 100 for the mounting of the label magazine 66 and a like label magazine 102 which is associated with the label transfer apparatus 20 and is best shown in FIG. 2.

Most particularly, with reference to FIG. 1, it will be seen that the extensible fluid cylinders 46 of the two label transfer apparatuses 18, 20 will be disposed in parallel side-by-side relation although slightly radially and circumferentially offset with a minimal clearance therebetween. This permits the label transfer apparatus 20 to be closely circumferentially adjacent the label transfer apparatus 18 for the proper timed positioning of labels in the outer mold halves 14 in cooperation with the timed positioning of labels in the inner mold halves 12.

Thus, by substituting an extensible fluid motor for a rotary fluid motor, the space requirement has been greatly reduced in an unobvious manner, making it possible to mount the two label transfer apparatuses 18, 20 within a very restricted space, thus permitting the delivery of labels to both inner and outer mold halves of a Ferris wheel type molding machine even when those mold halves are of a relatively short length as would occur when a short bottle, such as a 16 ounce bottle, is being blow molded.

I claim:

1. An apparatus for applying a label to an open mold half of a Ferris wheel type blow molding machine, said apparatus comprising a support member having means for attachment to a frame of a Ferris wheel type blow molding machine, a shaft assembly including a housing and a shaft rotatably journalled in said housing and projecting from opposite ends of said housing, means fixedly securing said housing to said support member with one of said shaft ends projecting transversely beyond said support member, a support unit carried by the other of said shaft ends, an extensible fluid motor carried by said support unit, said fluid motor having an axis disposed substantially normal to said shaft, and a label pick-up and delivery suction head carried by said extensible fluid motor for controlled projection and retraction; and drive means for selectively and rotatably oscillating said shaft to position said suction head at a label stack, then at an open mold half, and return to the label stack, said drive means including a second extensible fluid motor, said second extensible fluid motor having a cylinder and a piston carrying a piston rod, mounting means mounting an end of said cylinder remote from said piston rod to said support member, a lever arm on said shaft one end, and means directly connecting said piston rod to said lever arm.

2. Apparatus according to claim 1 wherein the diameter and stroke of said second extensible fluid motor taken in combination with the usable fluid pressure and the effective length of said lever arm provide the required force to oscillate said shaft while occupying a minimum of space circumferentially of said blow molding machine.

3. Apparatus according to claim 1 wherein there are two of said apparatus, one each for two mold halves of a single mold wherein said mold halves open in a radial direction and said mold halves include an inner mold half and an outer mold half, said apparatus being arranged in back-to-back relation with said drive means being in substantially interfering relation, and the permissible small cross section of said second extensible fluid motor forming clearance means.

4. Apparatus according to claim 3 wherein both of said apparatus are carried by said support member.

5. Apparatus according to claim 4 wherein both of said drive means are disposed on the same side of said support member.

6. Apparatus according to claim 3 wherein said second extensible fluid motors are disposed in parallel relation.

7. Apparatus according to claim 1 wherein said support member has offset to one side thereof on the side facing said housing a mounting plate for said housing, said support members lying in a general plane, said lever arm in part lying in said general plane, and said second extensible fluid motor generally overlying said support member.

8. Apparatus according to claim 1 wherein said second extensible fluid motor has an axis disposed normal to said axis of the first mentioned fluid motor.

9. Apparatus according to claim 1 wherein said second extensible fluid motor has an axis disposed normal to said axis of the first mentioned fluid motor and transversely offset therefrom.

10. Apparatus according to claim 1 wherein said second extensible fluid motor has an axis disposed normal to said axis of the first mentioned fluid motor and parallel to said shaft.

* * * * *